United States Patent

Miyakusu et al.

Patent Number: 5,494,537
Date of Patent: Feb. 27, 1996

[54] HIGH STRENGTH AND TOUGHNESS STAINLESS STEEL STRIP AND PROCESS FOR THE PRODUCTION OF THE SAME

[75] Inventors: Katsuhisa Miyakusu; Sadao Hirotsu; Koki Tomimura, all of Yamaguchi, Japan

[73] Assignee: Nisshin Steel Co. Ltd., Tokyo, Japan

[21] Appl. No.: 383,130

[22] Filed: Feb. 3, 1995

[30] Foreign Application Priority Data

Feb. 21, 1994 [JP] Japan ..................... 6-044744
Apr. 28, 1994 [JP] Japan ..................... 6-111741

[51] Int. Cl.⁶ .................... C21D 8/02; C22C 38/44
[52] U.S. Cl. ................ 148/325; 148/326; 148/327; 148/608; 407/119
[58] Field of Search .................... 148/325, 327, 148/326, 608; 407/119

[56] References Cited

U.S. PATENT DOCUMENTS 2,868,638  1/1959  Mott ........................ 148/326
2,920,954  1/1960  Mott ........................ 148/326

FOREIGN PATENT DOCUMENTS 1267854  5/1968  Germany ................... 148/608
62-256949  11/1987  Japan .
4-202643  7/1992  Japan .

Primary Examiner—Deborah Yee
Attorney, Agent, or Firm—Lowe, Price, LeBlanc & Becker

[57] ABSTRACT

For a purpose of providing a high strength and toughness stainless steel strip having not only a high strength of at least 1800 N/mm² but also a high Erichsen break stress, which is a measure of toughness of a thin sheet, of as high as at least 1000 N/mm², there is provided a stainless steel strip consists essentially of in mass % C: up to 0.1%, (exclusive of 0%); Si more than 1.0% and not more than 4.0%; Mn: up to 5.0% (exclusive of 0%); Ni: from 4.0 to 10.0%; Cr :from 12.0 to 18.0%; Cu :up to 5.0% (inclusive of 0%); Mo: from 1.0 to 5.0%; N: up to (exclusive of 0%); the balance being Fe and impurities with the proviso of C+N≧0.1%, and wherein the alloying elements are adjusted so that a value of Md(N) defined by the following equation:

$$Md(N)=580-520\times[\%\ C]-2\times[\%\ Si]-16\times[\%\ Mn]-16\times[\%\ Cr]-23\times[\%\ Ni]-26\times[\%\ Cu]-10\times[Mo\ \%]$$

falls within the range between 20 and 100, the strip having a metallic structure of a retained austenitic phase containing from 30 to 80% by volume of a work induced martensitic phase.

6 Claims, 7 Drawing Sheets

HIGH STRENGTH AND TOUGHNESS STAINLESS STEEL STRIP AND PROCESS FOR THE PRODUCTION OF THE SAME

FIELD OF APPLICATION IN INDUSTRY

The invention relates to a stainless steel strip or sheet suitable for use as a material of parts where in addition to corrosion resistance high strength and toughness are required. Such parts include, for example, a plate spring, a coil spring, an ID (inner diameter) saw blade for precisely slicing a semi-conducting material such as silicon and a metallic gasket of an automobile engine. The invention also relates to a process for the production of such a stainless steel strip or sheet. The invention further relates to an ID saw blade for precisely slicing a semi-conducting material such as silicon. The term "strip" used herein includes strip, sheet and plate.

PRIOR ART

When preparing the above-mentioned parts requiring high strength and toughness with stainless steels, martensitic stainless steels, work hardening stainless steels and precipitation hardenable stainless steels have heretofore been used.

Martensitic stainless steels are based on hardening by quenching the steel which is austenitic at a high temperature to transform the austenite to martensite. Commercial martensitic stainless steels include, for example, SUS420J1 and SUS420J2. With these steels, high strength and toughness are achieved by a tempering heat treatment comprising quenching and tempering. However, in a case wherein the intended product is extremely thin, the product of the desired shape is not always obtained, since the product will be deformed due to thermal strain upon quenching.

For this reason, in the production of thin products, work hardenable austenitic stainless steels including, for example, SUS301 and SUS304, have been used. These steels are austenitic in the solution treated condition, and a high strength is achieved by cold working the solution treated austenitic steel so as to form work induced martensite. A level of the achieved high strength depends upon an amount of the work induced martensite and in turn upon a degree of the cold working. However, it is extremely difficult to control the strength simply by the cold working. Use of a high cold reduction rate not only increases the anisotropy of the material but also lowers the toughness of the material.

With precipitation hardening stainless steels which contain alloying elements having a strong precipitation hardening ability, hardening can be effected by aging treatment. Typical precipitation hardening stainless steels include SUS630 containing Cu and SUS631 containing Al. When SUS630 is solution treated and aged, a tensile strength of only at most 1400 N/mm² can be achieved. With SUS631, the steel is solution treated to form a metastable austenite phase, a part of which is then transformed to a martensite phase by a pretreatment such as cold working and finally the pretreated steel is aged to precipitate an intermetallic compound Ni₃Al. Thus, with SUS631 a considerably high tensile strength up to 1800 N/mm² can be achieved since positive formation of work induced martensite is involved as mentioned above.

Utilizing the increase of strength by aging, stainless steels having a strength higher than that of the steel species mentioned above have been developed. For example, JP A 62-256949 and JP A 4-202643 disclose that a combination of tensile strength of 2000 N/mm² and a Vicker's hardness of 580 has been achieved by cold working of a metastable austenite having Cu and Si conjointly added thereto to form a duplex structure of austenite and work induced martensite followed by aging treatment. However, in order to achieve the indicated high level of the strength, since severe cold working sufficient to form a considerable amount of martensite is required, the toughness of the steel is necessarily reduced.

PROBLEMS OF THE INVENTION

An attempt to increase the strength of an austenitic stainless steel by utilizing age hardening and/or work hardening poses a problem of a considerable reduction in the toughness of the steel since cold rolling of a high reduction rate is required. Furthermore, in a case wherein the product is extremely thin, the shape of the product is impaired.

Accordingly, if the above-mentioned problem of reduction in the toughness of the steel owing to the strong cold rolling is overcome, materials suitable for use in parts where high strength and toughness are required, such as a plate spring, a coil spring, an ID (inner diameter) saw blade for precisely slicing a semi-conducting material and a metallic gasket of an automobile engine can be provided. An object of the invention is to solve the problem.

SUMMARY OF THE INVENTION

In accordance with one aspect of the invention there is provided a high strength and toughness stainless steel strip which consists essentially of in mass %:

C: up to 0.1% (exclusive of 0%);
Si: more than 1.0% and not more than 4.0%;
Mn: up to 5.0% (exclusive of 0%);
Ni: from 4.0 to 10.0%;
Cr: from 12.0 to 18.0%;
Cu: up to 5.0% (exclusive of 0%);
Mo: from 1.0 to 5.0%;
N: up to (exclusive of 0% );

the balance being Fe and unavoidable impurities with the proviso that $$C+N \geqq 0.1\%$$

is satisfied, and wherein the alloying elements are adjusted so that a value of Md(N) defined by the following equation:

$$Md(N)=580-520\times[\% \text{ C}]-2\times[\% \text{ Si}]-16\times[\% \text{ Mn}]-16\times[\% \text{ Cr}]-23\times[\% \text{ Ni}]-26\times[\% \text{ Cu}]-10\times[\text{Mo }\%]$$

falls within the range between 20 and 100, said strip having a metallic structure of a retained austenitic phase containing from 30 to 80% by volume of a work induced martensitic phase.

According to another aspect of the invention there is provided a process for the production of the above-mentioned high strength and toughness stainless steel strip which comprises the steps of:

solution treating a stainless steel strip having the above-mentioned composition at a temperature within the range between 980° and 1150° C. and under conditions for forming grains of a single austenite phase having an average diameter of from 5 to 50 μm, each grain including not more than 5 undissolved precipitates having a size of more than 100 nm, cold rolling the strip having the so obtained metallic structure at a rolling reduction sufficient to form 30 to 80% by volume of work induced martensite, and aging the strip at a temperature of from 300° to 650° C. for 0.5 to 5 minutes.

According to a special aspect of the invention there is provided an ID saw blade for slicing a semi-conducting material into wafers which comprises the above-mentioned high strength and toughness stainless steel strip.

FUNCTION

As demonstrated herein in Examples, the stainless steel strip according to the invention has a combination of a strength as high as at least 1800 N/mm$^2$ and an Erichsen break stress as high as st least 1000 N/mm$^2$. The Erichsen break stress is a measure suitable for estimating the toughness of thin sheet materials, and is a value calculated from [a load which breaks a sheet-like test piece in the well known Erichsen test] divided by [the thickness of the test piece multiplied by the diameter of the punch used in the test].

Precise mechanisms underlying the high strength and toughness of the stainless steel strip according to the invention are not yet fully understood, it is believed that the following functions are operating.

(1) The finally aged strip according to the invention having a mixed structure of work induced martensite and retained austenite has such a property that when the strip is strained the retained austenite is appropriately transformed to martensite. This property is attributed to the fact that the alloying elements C, N, Si, Mn, Ni, Cr, Cu and Mo are adjusted not only individually so that they fall within the ranges respectively prescribed herein, but also mutually so that the Md(N) value falls in the range between 20 and 100 (see Example 1).

(2) The presence of a considerably high amount of Mo dissolved in the steel advantageously serves to suppress grains from becoming coarse at the time of the solution treatment of the steel as well as to enhance the strength and toughness of the steel even if the aging treatment is carried out at a relatively elevated temperature subsequent to the cold rolling.

(3) Since the solution treated material which comprises fine austenite grains of a diameter not greater than 50 μm, each grain including a limited number of undissolved precipitates is cold rolled and aged, Fine precipitates are formed at the time of aging. Furthermore, when the aged material is strained, the retained austenite is transformed to fine martensite thereby relaxing concentration of stress leading to cracking of the material.

Characteristic features of the steel according to the invention will now be described. First of all, functions and contents of individual alloying elements of the steel according to the invention will be described. The percentages referred to herein are by mass, unless otherwise specified.

C is an austenite forming element and very effectively serves to control formation of undesired δ-ferrite at high temperatures and to strengthen the work induced martensitic phase. However, since the steel according to the invention contains a relatively high amount of Si, the solubility of C in the steel is relatively low. Accordingly, if C is increased Cr carbide precipitates in grain boundaries, causing to lower the resistance to intergranular corrosion and toughness of the steel. For these reasons, the C content should be up to 0.1% (exclusive of 0%) and preferably from 0.05 of 0.1%.

Si is normally added to steels for a purpose of deoxygenation. When Si is added for this purpose, the Si amount is generally up to 1.0% as seen in work hardenable austenitic stainless steels such as SUS301 and SUS304. In the invention we use a higher Si content in order to promote the formation of the martensitic phase at the time of the cold working, to strengthen the martensitic phase, to cause to dissolve Si in the retained austenitic phase to strengthen, thereby to increase the strength of the steel as cold worked. Furthermore, we enhance the age hardening effect of the steel at the aging treatment by a conjoint function of the Si and Cu. For these characteristic effects, more than 1.0% of Si is required. On the other hand, the presence of an unduly high amount of Si may invite cracking of the product when processed at high temperatures. For these reasons the Si content should be more than 1.0% and not more than 4.0%, and preferably more than 1.0% and not more than 3.5%.

Mn is an element which governs the stability of the austenite phase. In the steel according to the invention the particular Mn content is determined in accordance with a balance with other alloying elements. Anyway, an unduly high Mn content hinders the formation of martensite upon cold working, the Mn content should be up to 5.0% (exclusive of 0%) and preferably up to 4.5% (exclusive of 0%).

Ni is an element to obtain an austenite phase at elevated and ambient temperatures. In the case of the invention, it is necessary to obtain a metastable austenite phase and to induce a martensite phase by cold working. If the Ni content is less than 4.0%, since a quantity of δ-ferrite phase is formed at an elevated temperature and in the course of cooling to ambient temperature a martensitic phase is formed, the steel can not be of a single austenitic phase. On the other hand, the presence of Ni in excess of 10.0% hinders the formation of martensite upon cold working. Accordingly, the Ni content should be from 0.4 to 10.0%, preferably from 5.0 to 9.5%.

Cr is an element essential to ensure the corrosion resistance of the steel. For this purpose at least 12.0% of Cr is required. However, since Cr is a ferrite former, the presence of an unduly high amount of Cr invites the formation of a quantity of δ-ferrite at an elevated temperature. To suppress the formation of δ-ferrite it is necessary to add a surplus amount of austenite formers such as C, N, Ni, Mn and Cu. However, since the addition of excessive amount of these elements stabilizes the austenite at ambient temperature, work induced martensite is not formed upon cold working and in turn it becomes impossible to achieve the desired high strength by the ageing treatment. The Cr content should be at most 18.0%, and preferably from 12.0 to 16.5%.

Cu acts together with Si to harden the steel, as mentioned above. However, an excessive amount of Cu adversely affects the hot workability of the steel. Accordingly, if any Cu is added, the Cu content should be up to 3.5% (inclusive of 0%). A preferred Cu content is from 1.0 to 3.5%.

Mo serves to enhance the corrosion resistance of the product and to suppress the growth of austenite grains at the time of the solution treatment. Furthermore, Mo is very effective to suppress a rapid release of strain at the time of the aging treatment at a high temperature. In the production of the steel according to the invention, it is advantageous to carry out the aging treatment at a relatively high temperature thereby to reduce an excessive rolling strain and in turn to prevent the toughness from lowering due to the excessive rolling strain. On the other hand, unduly rapid release of strains at the time of the aging treatment at a high temperature adversely affects the toughness of the product. We have found that the presence of Mo effectively controls excessive disappearance of rearrangement owing to its drag effect even when the aging is carried out at a a relatively high temperature. Moreover, Mo forms precipitates by the aging treatment which contribute to the strength of the product. Thus, Mo is effective to prevent the strength from lowering at the time of aging at a relatively high temperature. For the characteristic functions and effects of Mo discussed above at least 1.0% of Mo is required. Whereas since an unduly high Mo content results in an undesirably high resistance to deformation at a high temperature to reduce of the hot workability of the product, Mo should be not more than 5.0%, preferably not more than 4.5%.

N is an element for forming austenite and is very effective to harden the austenitic and martensitic phases. However, since an unduly high content of N poses a problem of forming blow holes at the time of casting the steel, N should be up to 0.15% (exclusive of 0%), preferably from 0.04 to 0.10%.

C and N similarly act to harden the steel. For a purpose of the invention at least 0.10% of C and N in total is required. If C+N is less than 0.10% it becomes difficult to adjust other alloying elements within the ranges prescribed herein to achieve the intended strength and toughness.

All the alloying elements must be mutually adjusted so that a value of Md(N) defined herein falls within the range between 20 and 100. Or otherwise, as demonstrated in Example 1, the intended high tensile strength of at least 1800 N/mm$^2$ and the intended high Erichsen break stress of at least 1000 N/mm$^2$ will not be concurrently achieved.

The stainless steel strip according to the invention can be basically produced by a sequence of steps comprising solution treatment of dissolving precipitates in the mother phase (austenite phase), cold rolling of the solution treated steel at such a rolling reduction as to form from 30 to 80% by volume of work induced martensite in the retained austenite and final aging treatment of the cold rolled material. It is believed that if the Md(N) value is adjusted as prescribed herein, austenite has been transformed to martensite in such a condition that the retained austenite in the product may have enhanced the toughness.

The aged product according to the invention has a duplex structure of retained austenite having finely dispersed therein martensite (precisely work induced and tempered martensite). We now express retained austenite in an aged material with γ and work induced martensite (actually work induced and tempered martensite) in the aged material with α'. When such an aged material which comprises soft γ phases and hard α' phases is subjected to a deforming stress, a certain γ phase is deformed to concentrate the stress and a fine cracking is formed. The resulting strain is concentrated at a front end of propagation of cracking, where a fresh α' phase preventing further propagation of the cracking is formed. If a further external stress is applied, the stress is concentrated in another γ phase to form another cracking. Here again another fresh α' phase will be formed at the front end of the cracking.

The ability of the aged material according to the invention for forming α' phase when deformed is greatly correlated to the Md(N) value of the steel. If the Md(N) value is too small, no α phase is formed when the material is deformed, and thus the cracking is propagated in the γ phase to a large extent leading to breakage of the material, indicating a poor toughness of the material. Whereas if the Md(N) value is too large, α' phases are readily formed when the material is deformed, rendering further deformation of the material difficult. In this case, if the material is forcibly deformed further, it will crack and break, again indicating a poor toughness of the material. Thus, in both cases wherein the Md(N) value too small or too large, the γ→α' transformation can not be utilized in preventing the cracking from being propagated. One of the characteristic features of the invention resides in controlling the Md(N) value within the range between 20 and 100, thereby to advantageously utilize the transformation behaver of the soft γ phase rather than the hard α' phase for enhancing the toughness of the aged material.

Figure 1:
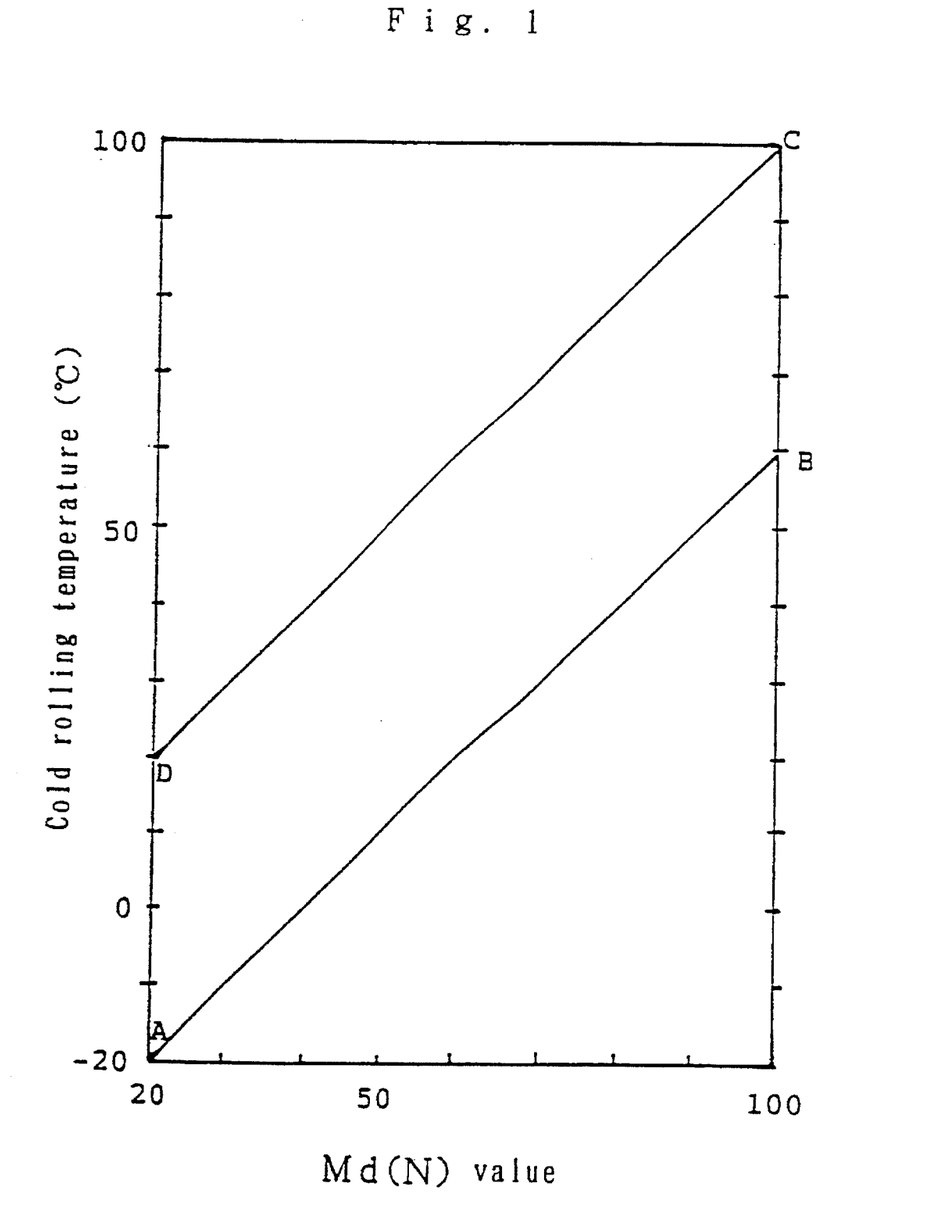
FIG. 1 is a graphical showing of an effect of the Md(N) value and the temperature of cold rolling on the amount of work induced martensite.

The Md(N) value is also a measure indicating the easiness of an α' phase being formed when the solution treated material is cold rolled. While the amount of an α' phase formed upon the cold rolling depends upon the cold rolling reduction rate, FIG. 1 shows a relation of the amount of an α' phase formed upon the cold rolling to the Md(N) value and the cold rolling temperature. In order to form 30 to 80% by volume of an α' phase, as intended herein, by cold rolling with a usual cold reduction rate of from 30 to 70%, it is sufficient to carry out the cold rolling with a practically normal cold reduction rate of from 30 to 70% at a temperature within the area ABCD shown in FIG. 1 in accordance with the particular value of the steel.

With conditions below line AB shown in FIG. 1 the finally aged product may have a low toughness because of its insufficient amount of γ phase, whereas with conditions above line CD shown in FIG. 1 the finally aged product may have a low strength because of its insufficient amount of α' phase.

The process for producing a high strength and toughness stainless steel strip according to the invention will now be described.

In the process according to the invention a starting stainless strip is produced by forming a melt of stainless steel in which the alloying elements are individually and mutually adjusted as prescribed herein followed by conventional casting or forging, hot rolling and optional cold rolling. The stating strip is solution treated at a temperature within the range between 980° and 1150° C. and under conditions for forming grains of a single austenite phase having an average diameter of from 5 to 50 μm, each grain including not more than 5 undissolved precipitates having a size of more than 100 nm. The solution treated strip is then cold rolled at a rolling reduction sufficient to form 30 to 80% by volume of work induced martensite and finally aging treated at a temperature of from 300° to 650° C., preferably from 475° to 650° C., for 0.5 to 5 minutes.

In the solution treatment step, for a purpose of enhancing the toughness of the finally aged material, the starting strip is heated to a temperature within the range between 980° and 1150° C. maintained at that temperature for a required period of time, normally for 30 to 300 seconds, and rapidly cooled, conveniently with water, to ambient temperature at a cooling rate sufficient not to form precipitates in the course of cooling. If the solution treatment temperature is substantially lower than 980° C., precipitates existing in the starting strip are not completely dissolve in the austenite mother phase and to the contrary relatively large precipitates are formed, and thus, the purpose of the solution treatment is not achieved. If precipitates are formed in the course of the solution treatment, an amount of fine precipitates contributing to the strength which are formed in the final aging treatment is reduced, leading to reduction in the strength of the aged material. Coarse precipitates remaining in the finally aged material renders the material susceptible to indentation, leading to reduction in the toughness of the material. If the solution treatment temperature is substantially in excess of 1150° C., coarse austenite grains are formed which adversely affect the toughness of the finally aged material.

Mo in the steel according to the invention advantageously serves to broaden the operable solution treatment temperature to a relatively high range of up to 1150° C. This is believed that Mo suppresses grain growth due to the so-called drag effect that the Mo atom itself diffuses slow. The effect of Mo for enhancing the toughness of the finally aged material in relation to the solution treatment temperature will be demonstrated in FIG. 2.

In the solution treatment step, in addition to the treatment temperature, the retention time at that temperature and the rate of cooling from that temperature to ambient temperature must be suitably selected so that grains of a single austenite phase having an average diameter of from 5 to 50 μm are formed and each austenite grain does not include more than 5 undissolved precipitates having a size of more than 100 nm. For this purpose, the retention time may normally be from 1 to 5 minutes, and the rate of cooling to ambient temperature may be at least 1° C./sec. The cooling is conveniently carried out with water. If the austenite grains in the solution treated strip has an average diameter greater than 50 μm, the intended high toughness of the finally aged material can not be achieved, even when precipitates are completely dissolved in the grains. On the other hand, if each grain includes more than 5 undissolved precipitates having a size of more than 100 nm on average, again the intended high toughness of the finally aged material can not be achieved, even when the grains have an average diameter of not greater than 50 μm. These are demonstrated in FIG. 3.

The solution treated strip is then cold rolled to form 30 to 80% by volume of work induced martensite. The amount of work induced martensite formed by the cold rolling depends upon the Md(N) value of the steel, the cold rolling reduction rate and the rolling temperature as described herein above with referance to FIG. 1. We select these parameters so as to form 30 to 80% by volume of martensite. With less than 30% by volume of martensite, the finally aged material does not have the intended high strength. In other words, at least 30% by volume of martensite is required to increase the strength of the material itself and to increase nuclear sites where precipitates are formed during the aging treatment to contribute to the strength by the precipitation hardening effect. Whereas with more than 80% by volume of martensite, an amount of retained austenire contributing to the toughness of the aged material is lacking, and in consequence, the desirably high toughness cannot be achieved.

Provided that a practically advantageous cold rolling rate ranging from 30 to 70% is adapted, the rolling temperature may be selected within the range between −20° C. and 100° C. in accordance with the particular Md(N) value of the steel, as shown in FIG. 1.

Subsequent to the cold rolling, the final aging treatment is carried out at a temperature within the range between 300° and 650° C. for a period of 0.5 to 5 minutes. The aging treatment of such a short period makes it possible to carry out the treatment by continuously passing the cold rolled strip through a continuous heat treatment furnace. With an aging treatment at a temperature substantially lower than 300° C. the intended high strength cannot be achieved. Whereas with an aging treatment at a temperature substantially higher than 650° C., a part of the work induced martensite is reversely transformed to austenite, again lowering the strength of the product. With an aging time shorter than 0.5 minute a sufficient aging effect cannot be expected, and an aging time longer than 5 minutes is inconvenient from the view point of continuous treatment.

In the steel according to the invention alloying elements which take a primary role of age hardening are Si, Cu, C,N and Mo, among which Si and Cu contribute to hardening due to their function of fixing strain introduced during the cold rolling, and C, N and Mo contribute to hardening by their function of forming precipitates. Particularly, Mo effectively acts not only to form precipitates but also to suppress excessive disappearance of rearrangement owing to its drag effect even the aging treatment is carried out at a relatively high temperature.

EXAMPLE 1

Table 1 shows the composition (mass % of alloying elements) and the Md(N) value of the tested steels. Steels T1 through T12 are steels according to the invention having contents of all the individual alloying elements and the Md(N) prescribed herein, while Steels a through i are control steels having either a content of a certain alloying element or a value of Md(N) is outside the scope of the invention. Each steel was melted in a vacuum furnace, forged, hot rolled, intermediately annealed and cold rolled to a thickness of 2.0 mm.

Each steel strip (except for the strip of Control Steel i) was solution treated under conditions including heating to a temperature of 1050° C., maintaining at that temperature for 1 minute and cooled to ambient temperature with water and cold rolled at a rate of rolling reduction indicated in Table 2. An amount (% by volume) of work induced martensite of each tested strip was determined and indicated in Table 2.

Each cold rolled strip was aging treated at a temperature of 570° C. for 1 minute. Test pieces were taken from each aging treated material and tested for a tensile strength and an Erichsen break stress. Results are shown in Table 2. The Erichsen break stress is a measure suitable for estimating the toughness of thin sheet materials, and is a value calculated from [a load which breaks a sheet-like test piece in the well known Erichsen test] divided by [the thickness of the test piece multiplied by the diameter of the punch used in the test]. The higher the Erichsen value the better the toughness.

TABLE 1

| | No. | C | Si | Mn | Ni | Cr | Cu | Mo | N | Md(N) |
|---|---|---|---|---|---|---|---|---|---|---|
| A | T1 | 0.083 | 2.54 | 0.31 | 7.52 | 15.59 | 1.68 | 1.25 | 0.074 | 26.0 |
| | T2 | 0.075 | 3.00 | 0.30 | 8.50 | 12.54 | 1.50 | 3.85 | 0.070 | 35.6 |
| | T3 | 0.080 | 2.72 | 4.18 | 5.22 | 16.20 | 0.20 | 1.53 | 0.095 | 37.8 |
| | T4 | 0.075 | 1.85 | 0.39 | 6.54 | 14.52 | 2.56 | 2.31 | 0.072 | 42.5 |
| | T5 | 0.058 | 1.35 | 1.26 | 6.80 | 13.48 | 2.51 | 2.30 | 0.078 | 43.2 |
| | T6 | 0.077 | 1.18 | 0.89 | 6.23 | 16.23 | 0.84 | 1.13 | 0.084 | 62.1 |
| | T7 | 0.075 | 1.85 | 0.39 | 6.34 | 14.12 | 1.72 | 3.05 | 0.062 | 65.5 |
| | T8 | 0.059 | 3.25 | 0.20 | 9.12 | 12.05 | 0.10 | 4.23 | 0.058 | 76.8 |
| | T9 | 0.082 | 2.73 | 0.37 | 5.91 | 13.13 | 2.00 | 1.52 | 0.066 | 93.0 |
| | T10 | 0.080 | 2.75 | 0.30 | 8.42 | 13.65 | 0.20 | 2.28 | 0.076 | 65.2 |
| | T11 | 0.086 | 2.63 | 0.31 | 8.25 | 13.73 | 0.17 | 2.24 | 0.064 | 70.0 |
| | T12 | 0.091 | 2.77 | 0.31 | 8.45 | 13.81 | 0.25 | 2.50 | 0.072 | 54.8 |
| B | a | 0.063 | 2.20 | 0.34 | 7.04 | 17.01 | 3.20 | 1.24 | 0.098 | −21.6 |
| | b | 0.075 | 1.85 | 0.39 | 8.00 | 15.25 | 1.72 | 3.05 | 0.062 | 9.2 |
| | c | 0.062 | 2.42 | 0.28 | 7.26 | 13.55 | 0.28 | 2.45 | 0.065 | 103.3 |
| | d | 0.082 | 2.68 | 0.28 | 6.25 | 13.79 | 0.15 | 1.85 | 0.070 | 119.7 |
| | e | 0.084 | 1.56 | 0.58 | 7.20 | 14.20 | 1.28 | 0.58 | 0.059 | 74.3 |
| | f | 0.071 | 2.58 | 1.58 | 6.89 | 13.78 | 1.98 | 0.45 | 0.078 | 54.3 |
| | g | 0.075 | 0.39 | 0.30 | 8.20 | 13.40 | 2.10 | 1.69 | 0.065 | 64.8 |
| | h | 0.067 | 0.78 | 1.50 | 7.85 | 16.24 | 0.70 | 0.90 | 0.067 | 31.9 |
| | i | 0.080 | 1.50 | 0.30 | 6.05 | 15.59 | 1.98 | 0.04 | 0.078 | 66.7 |

A: Steels according to the invention
B: Control steels outside the scope of the invention

TABLE 2

| | | | | | Aging at 570° C. for 1 minute | |
|---|---|---|---|---|---|---|
| | Steel | Md(N) | Cold rolling reduction (%) | Amount of martensite (vol %) | Tensile strength (N/mm$^2$) | Erichsen break stress (N/mm$^2$) |
| A | T1 | 26.0 | 50 | 40 | 1820 | 1442 |
| | | | 67 | 62 | 1952 | 1352 |
| | T2 | 35.6 | 50 | 45 | 1848 | 1546 |
| | | | 57 | 68 | 2025 | 1125 |
| | T3 | 37.8 | 41 | 49 | 1823 | 1518 |
| | | | 55 | 71 | 2020 | 1200 |
| | T4 | 42.5 | 50 | 53 | 1865 | 1346 |
| | | | 55 | 64 | 1972 | 1286 |
| | T5 | 43.2 | 50 | 54 | 1823 | 1518 |
| | | | 55 | 60 | 2020 | 1300 |
| | T6 | 62.1 | 45 | 53 | 1865 | 1346 |
| | | | 57 | 71 | 2072 | 1186 |
| | T9 | 93.0 | 35 | 54 | 1850 | 1202 |
| | | | 50 | 78 | 2080 | 1073 |
| | T10 | 64.2 | 41 | 40 | 1841 | 1520 |
| | | | 55 | 68 | 2072 | 1250 |
| | T12 | 54.8 | 50 | 53 | 1900 | 1346 |
| | | | 55 | 58 | 2052 | 1121 |
| B | a | −21.6 | 70 | 25 | 1672 | 1240 |
| | b | 9.2 | 70 | 42 | 1886 | 975 |
| | c | 103.3 | 30 | 53 | 1702 | 752 |
| | d | 119.7 | 30 | 54 | 1913 | 925 |
| | | | 45 | 78 | 2074 | 852 |
| | e | 74.3 | 40 | 55 | 1721 | 1527 |
| | | | 50 | 73 | 1787 | 1521 |
| | f | 54.3 | 45 | 41 | 1724 | 1442 |
| | | | 56 | 62 | 1798 | 1421 |
| | g | 64.8 | 54 | 65 | 1756 | 1398 |
| | h | 31.9 | 50 | 42 | 1720 | 1540 |

A: Steels according to the invention, B: Control steels

Table 2 reveals that the steel strips according to the invention have a combination of a tensile strength of at least 1800 N/mm$^2$ and an Erichsen break stress of at least 1000 N/mm$^2$ and thus are excellent in strength and toughness.

In contrast, Control Steels a through h do not concurrently satisfy a tensile strength of at least 1800 N/mm$^2$ and an Erichsen break stress of at least 1000 N/mm$^2$. The results can be analyzed as follows.

Control Steels a and b contain C, Si, Mn. Ni, Cr, Cu, Mo and N in amounts respectively prescribed herein, but have an Md(N) value lower than the range prescribed herein. With Control Steel a having an extremely low Md(N) value of −21.6, an amount of work induced martensite is as low as 25% by volume even at the practically highest cold reduction rate of 70%, and in consequence the aged material of Control Steel a has an undesirably low tensile strength. With Control Steel b having a low Md(N) value of 9.2, 42% by volume of martensite is formed at a cold reduction rate of 70%, and thus, the aged material has a satisfactory tensile strength. However, austenite retained in the aged material is hardly transformed to martensite during deformation of the material in the course of the Erichsen test, and thus the aged material of Control Steel b exhibits a low Erichsen break stress, indicating an unsatisfactory toughness.

Control Steels c and d contain C, Si, Mn. Ni, Cr, Cu, Mo and N in amounts respectively prescribed herein, but have an Md(N) value higher than the range prescribed herein. With these steels a sufficient amount of martensite is formed at a relatively low cold reduction rate. However, austenite retained in the aged material is transformed to martensite in early stages of deformation of the material when the material is subjected to the Erichsen test, and thus the aged material of these steels exhibits a low Erichsen break stress, indicating an unsatisfactory toughness.

As having described, even if amounts of individual alloying elements are within the respective ranges as prescribed herein, the aged material does not exhibit a satisfactory toughness, in a case wherein the Md(N) value is lower than the value prescribed herein since martensite is not formed during the deformation of the aged material and, in a case wherein the Md(N) value is higher than the value prescribed herein since martensite is too readily formed during the deformation of the aged material. It is believed that with the steels according to the invention in which the alloying elements are mutually adjusted so that the Md(N) value falls within the range between 20 and 100, the aged material exhibits not only a high strength but also a high Erichsen value because during the deformation of the aged material the transformation of austenite to martensite proceeds at an appropriate easiness. In other words, the combination of high strength and high toughness conjointly possessed by the steel according to the invention is to be attributed to the fact that the alloying elements are mutually adjusted so that the Md(N) value falls within the prescribed range.

On the other hand, aged materials of Control Steels e through h exhibit undesirably low tensile strength, although these steels have an Md(N) value within the range prescribed herein. This is believed that with Control Steels e and f having a Mo content lower than that prescribed herein the steels have started to be softened too early, whereas with Control Steels g and h having an Si content lower than that prescribed herein the Si has contributed to strengthening due to strain aging to a less extent.

EXAMPLE 2

A cold rolled strip of Steel T12 of Table 1 was heated to a temperature of 1050° C. maintained at that temperature for 1 minute and cooled with water to ambient temperature. The so solution treated strip was cold rolled at a rolling reduction rate of 55%. The so cold rolled material contained 58% by volume of work induced martensite.

Test pieces taken from the cold rolled material were aging treated under various aging conditions (varied temperatures and times). The aged test pieces were tested for the tensile strength and Erichsen break stress. Results are shown in Table 3 together with the aging conditions.

TABLE 3

| Steel | Aging conditions | | Tensile strength (N/mm$^2$) | Erichsen break stress (N/mm$^2$) |
| --- | --- | --- | --- | --- |
| | Temp. (°C.) | Time (min.) | | |
| A T12 | 300 | 5 | 1985 | 1212 |
| | 400 | 1 | 2004 | 1200 |
| | 570 | 1 | 2052 | 1121 |
| | 625 | 0.5 | 1987 | 1246 |
| B T12 | 250 | 5 | 1700 | 1151 |
| | 660 | 1 | 1712 | 1305 |
| | 700 | 1 | 1615 | 1052 |

(Cold rolling reduction 55%, Work induced martensite 58 vol %)
A: Process according to the invention
B: Process outside the scope of the invention Table 3 reveals that the aging treatment at a temperature of from 300° to 650° C. for a period of from 0.5 to 5 minutes provides a material excellent in both strength and toughness having a tensile strength of at least 1800 N/mm$^2$ and an Erichsen break stress of at least 1000 N/mm$^2$. Whereas the aging treatment at a lower temperature of 250° C. provides a product of a lower tensile strength probably because strain aging and precipitation hardening at the lower temperature are insufficient. On the other hand, the aging treatment at a higher temperature of 700° C. also provides a material of a lower tensile strength probably because a part of the work induced martensite formed by the cold rolling is reverse transformed to austenite upon aging at the higher temperature. The product aged at 700° C. also exhibits a lower Erichsen break stress. This is believed that because this temperature of 700° C. is within the sensitizing temperature range, coarse intergranular precipitates have been formed during the aging treatment at that temperature.

EXAMPLE 3

Each of cold rolled strips of Control Steel i containing 0.04% of Mo, Steels T6 containing 1.13% of Mo, T7 containing 3.05% of Mo and T8 containing 4.23% of Mo was solution treated at varied temperatures, cold rolled at a rolling reduction rate of 50%, and aging treated at a temperature of 500° C. for 1 minute. The aged materials were tested for the tensile strength and the Erichsen break stress. All the aged materials exhibited measured values of the tensile strength of substantially the same level on the order of from 1850 N/mm$^2$ to 2000N/mm$^2$.

However, measured values of the Erichsen break stress on the aged materials varied to a great extent depending upon the Mo content of the steel and the solution treatment temperature. The results are graphically shown in FIG. 2. The followings can be concluded from FIG. 2. First, the Erichsen break stress exhibits a peak value in a case wherein the solution treatment is carried out at a temperature of about 1000° C. irrespective of the kinds of the steel. Second, while the Erichsen break stress tends to decrease, as the solution treatment temperature is increased from about 1000° C., the degree of decrease of the Erichsen break stress is the most prominent with Control Steel i which contains only 0.04 mass % of Mo, whereas the degree of decrease of the Erichsen value is less prominent with Steels T6, T7 and T8 which contain at least 1.0 mass % of Mo according to the invention. Third, with the same solution treatment temperature, the higher the Mo content the higher the Erichsen break stress.

Thus, it can be understood that Mo not only greatly contributes to enhance the toughness of the steel according to the invention but also advantageously broadens the solution treatment temperature range to from 980° C. to 1150° C. which ensures to finally achieve the Erichsen break stress of at least 1000 N/mm$^2$.

Figure 2:
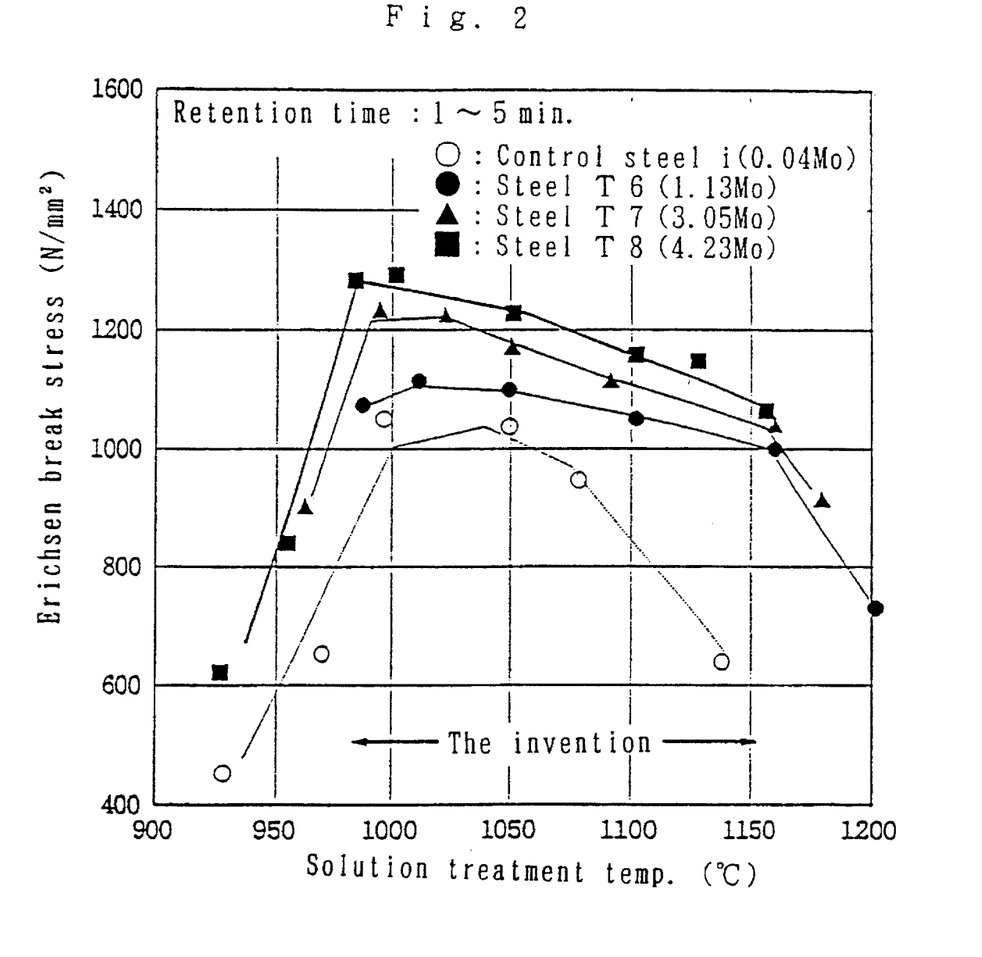
FIG. 2 is a graphical showing, on various Mo contents, of an effect of the temperature of solution treatment on the Erichsen break stress of the finally aged product.

FIG. 2 further reveals that the solution treatment at a temperature substantially lower than 980° C. provides a material having a reduced Erichsen break stress, irrespective of the kinds of steels. This is supposed that the solution treatment at a temperature substantially lower than 980° C. will leave undissolved precipitates, which would not ensure a high toughness intended herein, even if the material is adequately subjected to the subsequent cold rolled and aging treatment. FIG. 2 further reveals that the solution treatment at a temperature substantially higher than 1150° C. provides a material having a reduced Erichsen break stress. The higher the temperature, the more reduced Erichsen break stress. Supposing that this may be attributed to the fact that the higher solution treatment temperature will result the more coarse austenite grains, we carried out the experiments described in Example 4.

EXAMPLE 4

Test pieces taken from cold rolled strips of Steels T6 and T11 of Table 1 were solution treated under conditions indicated in Table 4. On each solution treated test piece the average diameter of the austenire grain and the number of precipitates in each grain (including the number of intergranular precipitates) were examined.

TABLE 4

| Plot | | Solution treatment | |
|---|---|---|---|
| No. | Steel | Temp. (°C.) | Time (sec.) |
| 1 | T11 | 920 | 60 |
| 2 | T6 | 950 | 60 |
| 3 | T11 | 1050 | 30 |
| 4 | T11 | 1120 | 30 |
| 5 | T6 | 980 | 60 |
| 6 | T6 | 1020 | 60 |
| 7 | T6 | 1100 | 60 |
| 8 | T11 | 1140 | 60 |
| 9 | T6 | 1160 | 60 |
| 10 | T11 | 1180 | 60 |
| 11 | T6 | 1200 | 60 |

The diameter of each austenite grain was measured by means of an optical microscope according to a comparison method and the average diameter of each austenite grain was determined. The number of precipitates was counted on arbitrary selected from 10 to 15 austenite grains by means of an electron microscope and the average number of undissolved precipitates having a size of at least 100 nm included in each grain was determined. Each test piece was then cold rolled at a reduction rate of 50% and aging treated at a temperature of 500° C. for 1 minute. The so aging treated material was tested for the Erichsen break stress.

Figure 3:
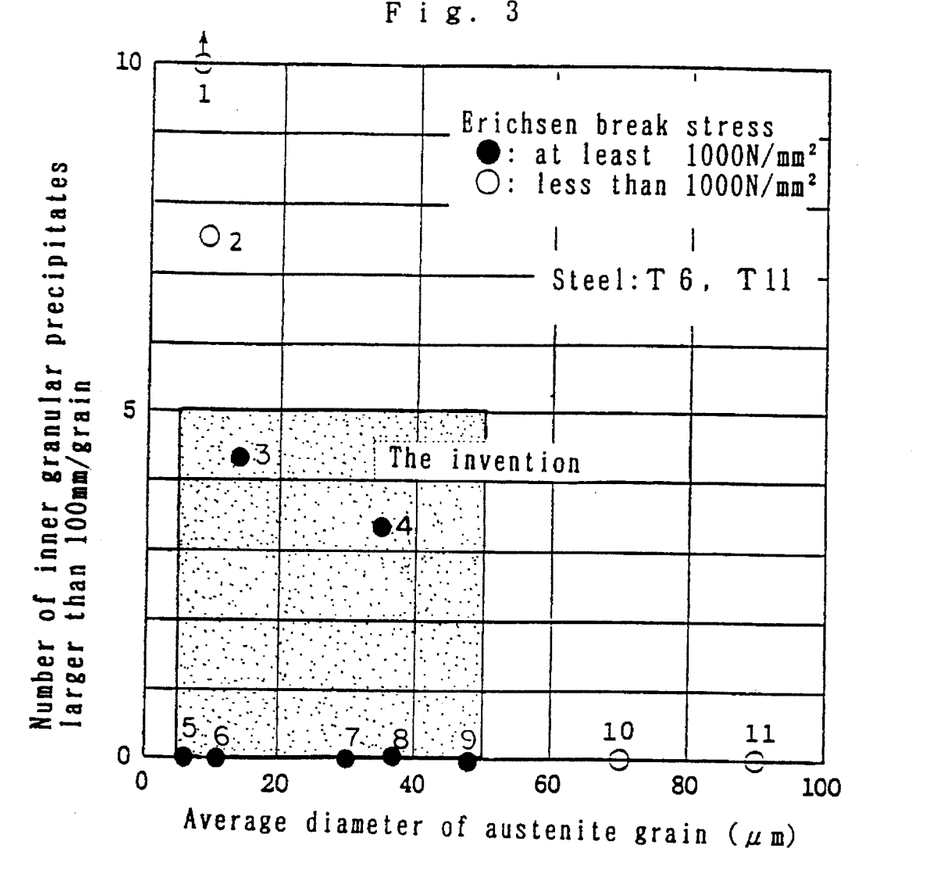
FIG. 3 is a graphical showing of an effect of the average diameter of austenite grains as formed by the solution treatment and the number of undissolved precipitates having a size of at least 100 nm included in each of the grains on the Erichsen break stress of the finally aged product.

The test results are graphically shown in FIG. 3, in which the abscissa represents the average diameter (μm) of austenite grain and the coordinate represents the average number of undissolved precipitates having a size of at least 100 nm included in each grain. Plots in FIG. 3 accompanied by plot numbers indicate respective test runs of the same plot numbers indicated in Table 4. Plots in FIG. 3 shown by solid circles indicate an Erichsen break stress of at least 1000 N/mm$^2$, whereas plots in FIG. 3 shown by blank circles indicate an Erichsen break stress of less than 1000 N/mm$^2$.

FIG. 3 reveals that the desirably high Erichsen stress of at least 1000 N/mm$^2$ csn be achieved only when the average diameter of the austenite grains is not larger than 50 μm and each austenite grain does not include more than 5 large precipitates on average which are not smaller than 100 nm. As in plot Nos. 10 and 11 where the average diameter of the austenite grains is larger than 50 μm, the intended high toughness is not achieved even when each grain does not include large precipitates, and as in plot Nos 1 and 2 where each grain includes not less than 5 large precipitates the intended high toughness is not achieved even when the average diameter of the austenite grains is not larger than 50 μm.

According to a special aspect of the invention there is provided an ID saw blade for slicing a semi-conducting material comprising a generally annular disc of a high strength and toughness stainless steel strip and fine particulate diamond fixed on the inner periphery of said annular disc constituting a blade edge for slicing the semi-conducting material, said strip consisting essentially of the above-mentioned high strength and toughness stainless steel strip having a tensile strength of at least 1800 N/mm$^2$ and an Erichsen break stress of at least 1000N/mm$^2$.

Figure 4:
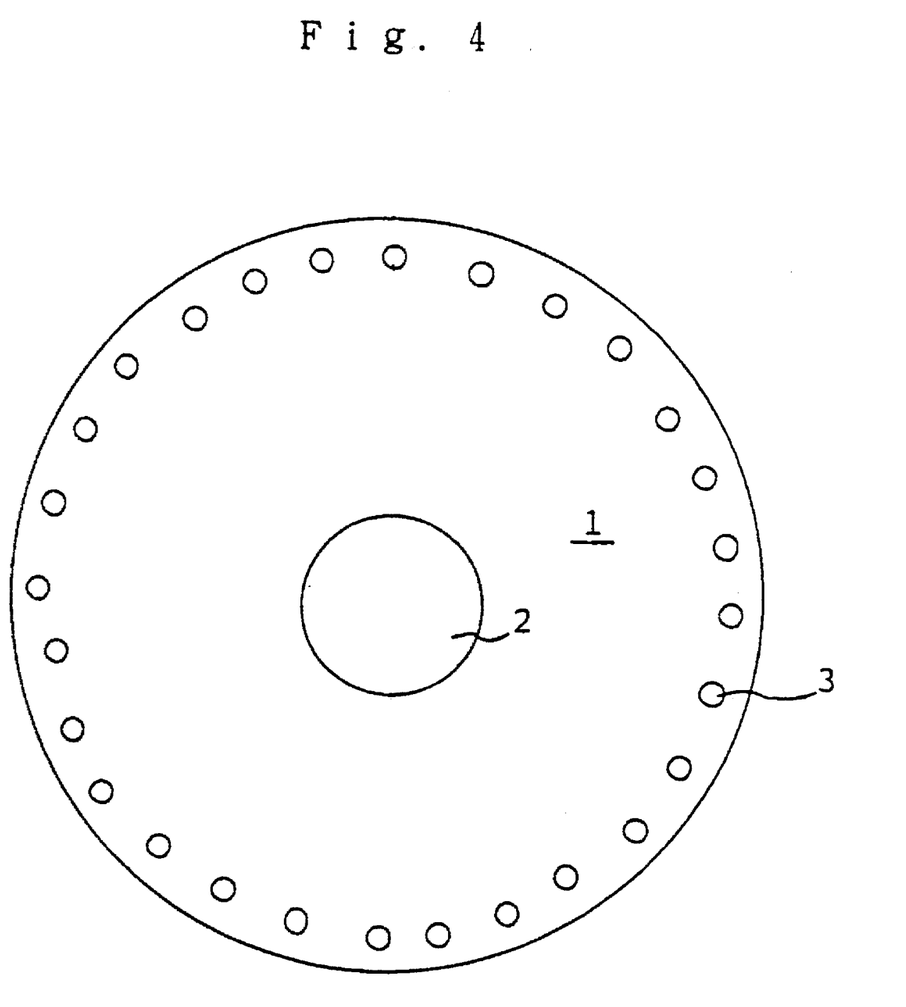
FIG. 4 is a plan view of an ID saw blade.

FIG. 4 is a plan view of an ID saw blade for slicing a semiconducting material such as silicon into wafers. As known in the art the ID saw blade comprises a generally annular disc 1 of a high strength and toughness stainless steel strip and fine particulate diamond (not shown) fixed on the inner periphery 2 of the annular disc 1 constituting a blade edge for slicing the semi-conducting material. Along the outer periphery of the annular disc 1 a plurality of bolt holes 3 are provided for securing the blade on a slicing machine (not shown). Furthermore, the blade is bulged by bolts (not shown) along a circular arc between its outer and inner peripheries so as to enhance the circularity of its circular blade edge during the slicing operation. Thus, the blade is repeatedly subjected to tensile stresses normally not less than 1800 N/mm$^2$.

Figure 5:
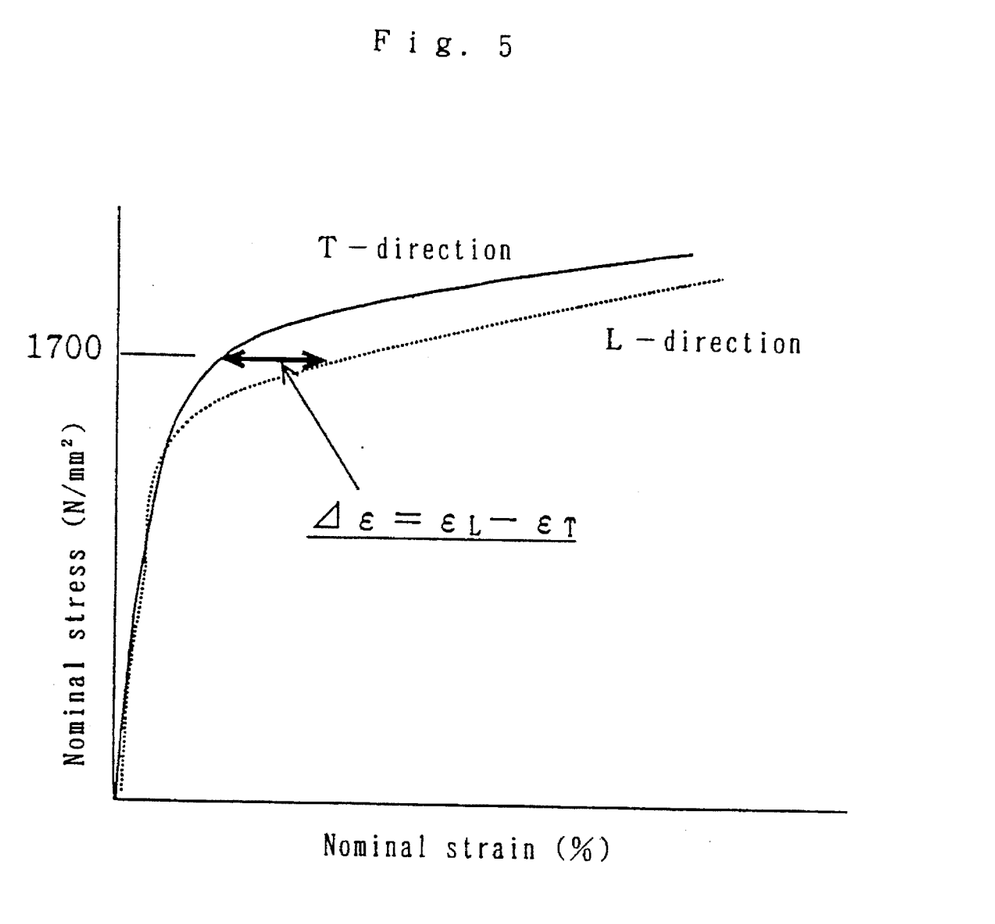
FIG. 5 shows stress-strain curves obtained from tensile tests carried out in an L direction (the rolling direction) and a T direction (the direction perpendicular to the rolling direction) on test pieces taken from a finally aged material.

When the high strength and toughness stainless steel strip according to the invention is used as a material of an ID saw blade for slicing a semi-conducting material, the strip should preferably have a low elongation anisotropy (Δε) defined below of not more than 0.15%. FIG. 5 shows stress-strain curves obtained from tensile tests carried out in an L direction (the rolling direction) and a T direction (the direction perpendicular to the rolling direction) on test pieces taken from a finally aged material. As shown in FIG. 5, we define the elongation anisotropy (Δε) as being the difference between strains in the L and T directions (εL–εT) at a tensile load of 1700 N/mm$^2$.

Some of the finally aged strips shown in Table 2 were tested for the elongation anisotropy (Δε). Results are shown in Table 5.

TABLE 5

| No. | | Rolling reduction (%) | Δε (%) | TS (N/mm²) | Er.BS (N/mm²) |
|---|---|---|---|---|---|
| A | T1 | 67 | 0.14 | 1952 | 1352 |
|   | T2 | 57 | 0.13 | 2025 | 1125 |
|   | T3 | 55 | 0.13 | 2020 | 1200 |
|   | T4 | 55 | 0.14 | 1972 | 1286 |
|   | T5 | 55 | 0.15 | 2020 | 1300 |
|   | T6 | 57 | 0.10 | 2072 | 1186 |
|   | T7 | 55 | 0.08 | 2020 | 1200 |
|   | T8 | 50 | 0.12 | 2072 | 1086 |
|   | T9 | 50 | 0.14 | 2080 | 1073 |
| B | a | 70 | —* | 1672 | 1240 |
|   | b | 70 | 0.08 | 1886 | 975 |
|   | c | 30 | 0.24 | 1702 | 752 |
|   | d | 45 | 0.29 | 2074 | 852 |
|   | e | 50 | 0.19 | 1787 | 1521 |
|   | f | 56 | 0.24 | 1798 | 1421 |
|   | g | 54 | 0.21 | 1756 | 1398 |
|   | h | 50 | 0.26 | 1720 | 1540 |

(Aging at 570° C. for 60 sec.)
A: Steels according to the invention
B: Control steels
TS: Tensile strength
Er.BS: Erichsen break stress
—*: cannot be measured It is revealed from Table 5 that strips of Steels T1 through T9 according to the invention have a tensile strength of at least 1800 N/mm² and an Erichsen break stress of at least 1000 N/mm² and exhibit an elongation anisotropy (Δε) of not more than 0.15%, whereas strips of Control Steels a through h either exhibit an elongation anisotropy (Δε) of more than 0.15% or does not have a tensile strength of at least 1800 N/mm² or an Erichsen break stress of at least 1000 N/mm².

Figure 6:
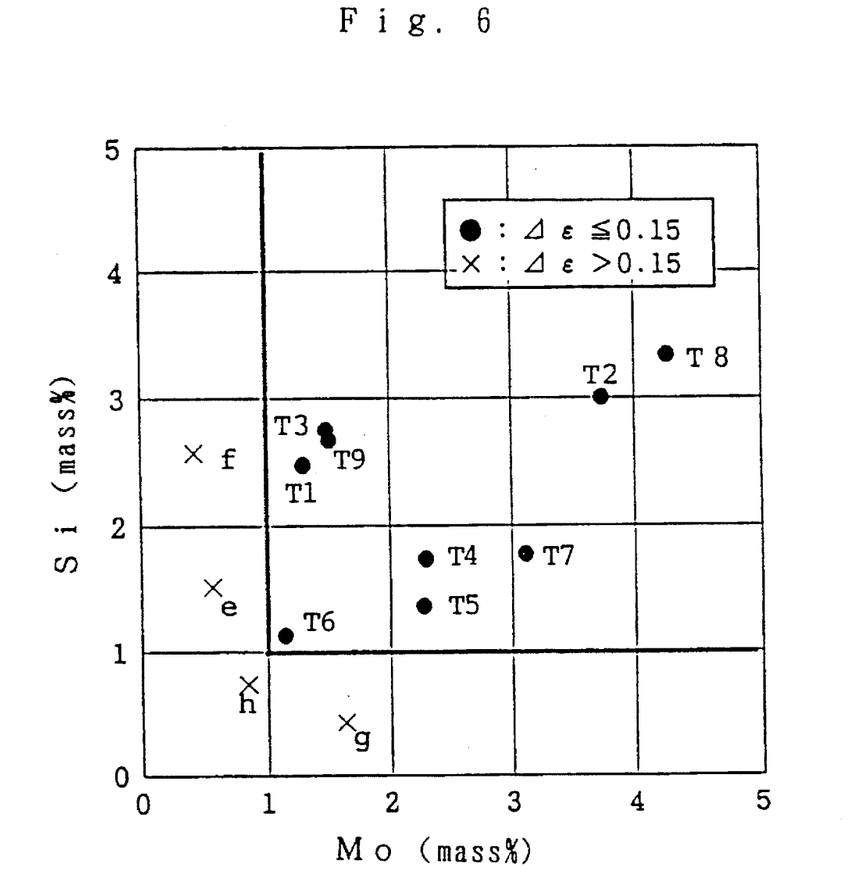
FIG. 6 shows a relation between an elongation anisotropy of a finally aged material and contents of Si and Mo in the steel.
Figure 7:
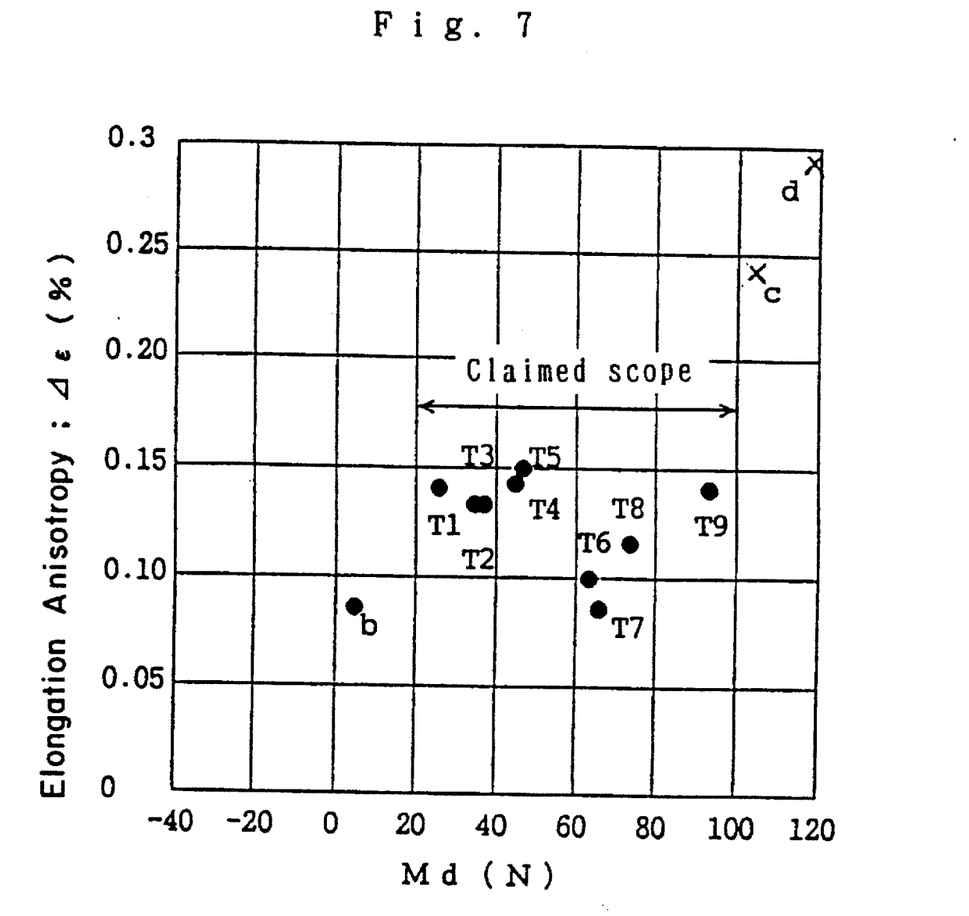
FIG. 7 shows a relation between an elongation anisotropy of a finally aged material and an Md(N) value of the steel.

Based upon the Si and Mo contents and the Md(N) values of the steel shown in Table 1 and the elongation anisotropy (Δε) of the aging treated strip shown in Table 5, FIGS. 6 and 7 are obtained. In FIGS. 6 and 7, the solid circles represent a desirably low elongation anisotropy (Δε) not more than 0.15% of the strip, while the x marks an undesirable elongation anisotropy (Δε) of more than 0.15% and the steels concerned are indicated by symbols T1 through T9 and letters b through h. In FIG. 6, the abscissa represents an amount of Mo of the steel in mass %, while the coordinate an amount of Si of the steel in mass %. In FIG. 7, the abscissa represents an Md(N) value of the steel, while the coordinate an elongation anisotropy (Δε) of the strip. It will be understood from FIGS. 6 and 7 that a desirably low elongation anisotropy (Δε) not more than 0.15% of the strip can only be ensured when the steel contains sufficient amounts of Si and Mo and has an Md(N) value of not more than 100.

ID saw blades were prepared from strips of Steels T2, T6 and T8 according to the invention and strips of Control steels a, c and e shown in Table 5 by cuting out an annular disc and fixing fine particulate diamond on the inner periphery of the so cut out annular disc. Each saw blade was mounted on a slicing machine and a single crystal of silicon having a diameter of 6 inches was sliced to wafers until the saw blade was broken. The number of wafers safely sliced by each saw blade is shown in Table 6.

TABLE 6

| Steel No. | | Rolling reduction (%) | Sliced wafers | Δε (%) | TS | Er.BS |
|---|---|---|---|---|---|---|
| A | T2 | 57 | 4800 | 0.13 | 2025 | 1125 |
|   | T6 | 57 | 5000 | 0.10 | 2072 | 1186 |
|   | T8 | 50 | 4400 | 0.12 | 2072 | 1086 |
| B | a | 70 | 0*¹ | 0.15 | 1672 | 1240 |
|   | c | 30 | 800 | 0.24 | 1702 | 752 |
|   | e | 50 | 1500 | 0.17 | 1787 | 1521 |

(Aging at 570° C. for 60 sec.)
A: Steels according to the invention
B: Control steel
TS: Tensile strength (N/mm²)
Fr.BS: Erichsen break stress (N/mm²)
*¹: Impossible to use because cannot be budged.

As revealed from Table 6, ID saw blades prepared from strips according to the invention can safely slice more than 4000 wafers. Whereas ID saw blades prepared from strips of Control steels cannot be properly bluged on the slicing machine or can only slice not more than 1500 wafers.

We claim:

1. A high strength and toughness stainless steel strip which consists essentially of in mass %:

C: up to 0.1% (exclusive of 0%);
Si: more than 1.0% and not more than 4.0%;
Mn: up to 5.0% (exclusive of 0%);
Ni: from 4.0 to 10.0%;
Cr: from 12.0 to 18.0%;
Mo: from 1.0 to 5.0%;
N: up to 0.15% (exclusive of 0%);

the balance being Fe and unavoidable impurities with the proviso that $$C-N \geq 0.1\%$$

is satisfied, and wherein the alloying elements are adjusted so that a value of Md(N) defined by the following equation:

$$Md(N)=580-520\times[\% \text{ C}]-2\times[\% \text{ Si}]-16\times[\% \text{ Mn}]-16\times[\% \text{ Cr}]-23\times[\% \text{ Ni}]-10\times[\text{Mo \%}]$$

falls within the range between 20 and 100, said strip having a metallic structure of a retained austenitic phase containing from 30 to 80% by volume of work induced martensitic phase.

2. A high strength and toughness stainless steel strip which consists essentially of in mass %:

C: up to 0.1% (exclusive of 0%);
Si: more than 1.0% and not more than 4.0%;
Mn: up to 5.0% (exclusive of 0%);
Ni: from 4.0 to 10.0%;
Cr: from 12.0 to 18.0%;
Cu: up to 5.0% (exclusive of 0%);
Mo: from 1.0 to 5.0%;
N: up to (exclusive of 0% );

the balance being Fe and unavoidable impurities with the proviso that $$C+N \geq 0.1\%$$

is satisfied, and wherein the alloying elements are adjusted so that a value of Md(N) defined by the following equation:

$$Md(N)=580-520\times[\% \text{ C}]-2\times[\% \text{ Si}]-16\times[\% \text{ Mn}]-16\times[\% \text{ Cr}]-23\times[\% \text{ Ni}]-26\times[\% \text{ Cu}]-10\times[\text{Mo \%}]$$

falls within the range between 20 and 100, said strip having a metallic structure of a retained austenitic phase containing from 30 to 80% by volume of a work induced martensitic phase.

3. The high strength and toughness stainless steel strip in accordance with claim 1 wherein said strip has a tensile strength of at least 1800 N/mm² and an Erichsen break stress of at least 1000 N/mm².

4. A process for the production of a high strength and toughness stainless steel strip which comprises the steps of:

solution treating a stainless steel strip which consists essentially of in mass %:
C: up to 0.1% (exclusive of 0%);
Si: more than 1.0% and not more than 4.0%;
Mn: up to 5.0% (exclusive of 0%);
Ni: from 4.0 to 10.0%;
Cr: from 12.0 to 18.0%;
Cu: up to 5.0% (inclusive of non-addition);
Mo: from 1.0 to 5.0%;
N: up to (exclusive of 0%);
the balance being Fe and unavoidable impurities with the proviso that $$C+N \geq 0.1\%$$

is satisfied, and wherein the alloying elements are adjusted so that a value of Md(N) defined by the following equation:

$$Md(N)=580-520\times[\% \text{ C}]-2\times[\% \text{ Si}]-16\times[\% \text{ Mn}]-16\times[\% \text{ Cr}]-23\times[\% \text{ Ni}]-26\times[\% \text{ Cu}]-10\times[\text{Mo }\%]$$

falls within the range between 20 and 100 at a temperature within the range between 980° and 1150° C. and under conditions for forming grains of a single austenite phase having an average diameter of from 5 to 50 µm, each grain including not more than 5 undissolved precipitates having a size of more than 100 nm, cold rolling the strip having the so obtained metallic structure at a rolling reduction sufficient to form 30 to 80% by volume of work induced martensite, and aging the strip at a temperature of from 300° to 650° C. for 0.5 to 5 minutes.

5. An ID saw blade for slicing a semi-conducting material comprising a generally annular disc of a high strength and toughness stainless steel strip and fine particulate diamond fixed on the inner periphery of said annular disc constituting a blade edge for slicing the semi-conducting material, said strip consisting essentially of in mass %:
C: up to 0.1% (exclusive of 0%);
Si: more than 1.0% and not more than 4.0%;
Mn: up to 5.0% (exclusive of 0%);
Ni: from 4.0 to 10.0%;
Cr: from 12.0 to 18.0%;
Cu: up to 5.0% (exclusive of 0%);
Mo: from 1.0 to 5.0%;
N: up to (exclusive of 0%);
the balance being Fe and unavoidable impurities with the proviso that $$C+N \geq 0.1\%$$

is satisfied, and wherein the alloying elements are adjusted so that a value of Md(N) defined by the following equation:

$$Md(N)=580-520\times[\% \text{ C}]-2\times[\% \text{ Si}]-16\times[\% \text{ Mn}]-16\times[\% \text{ Cr}]-23\times[\% \text{ Ni}]-26\times[\% \text{ Cu}]-10\times[\text{Mo }\%]$$

falls within the range between 20 and 100, said strip having a metallic structure of a retained austenitic phase containing from 30 to 80% by volume of a work induced martensitic phase, said strip having a tensile strength of at least 1800 N/mm² and an Erichsen break stress of at least 1000 N/mm².

6. The ID saw blade in accordance with claim 5 wherein said strip exhibits an elongation anisotropy (Δε) defined herein of not more than 0.15%.

* * * * *